United States Patent [19]

Keup et al.

[11] Patent Number: 5,148,845
[45] Date of Patent: Sep. 22, 1992

[54] WOODWORKING ROTARY CUTTER APPARATUS

[76] Inventors: Karl F. Keup; Ellen B. Davidson-Keup, both of 2330 Kevenauer Dr., Brookfield, Wis. 53005

[21] Appl. No.: 740,712

[22] Filed: Aug. 6, 1991

[51] Int. Cl.⁵ .................. B26D 1/12; B27G 13/00
[52] U.S. Cl. ...................... 144/218; 82/158; 407/40
[58] Field of Search ............... 144/218, 134 R; 408/219, 225; 407/40, 50, 51; 82/158

[56] References Cited

U.S. PATENT DOCUMENTS 4,293,254 10/1981 Markovics .................. 407/40
4,334,446 6/1982 Field .......................... 407/40

Primary Examiner—W. Donald Bray
Attorney, Agent, or Firm—Leon Gilden

[57] ABSTRACT

A cutter apparatus for use in providing woodworking patterns within a workpiece includes a cylindrical base member formed with a cylindrical collared shank coaxially aligned and orthogonally mounted to the top end portion of the cylindrical base member, with a cylindrical support shank diametrically directed orthogonally relative to the cylindrical base member, with the cylindrical support shank including a forward end mounting a cutter blade replaceably thereto, with a rear terminal end of the support shank mounting counter-balanced weights in adjustable relationship for counter-balancing the organization in use.

4 Claims, 4 Drawing Sheets

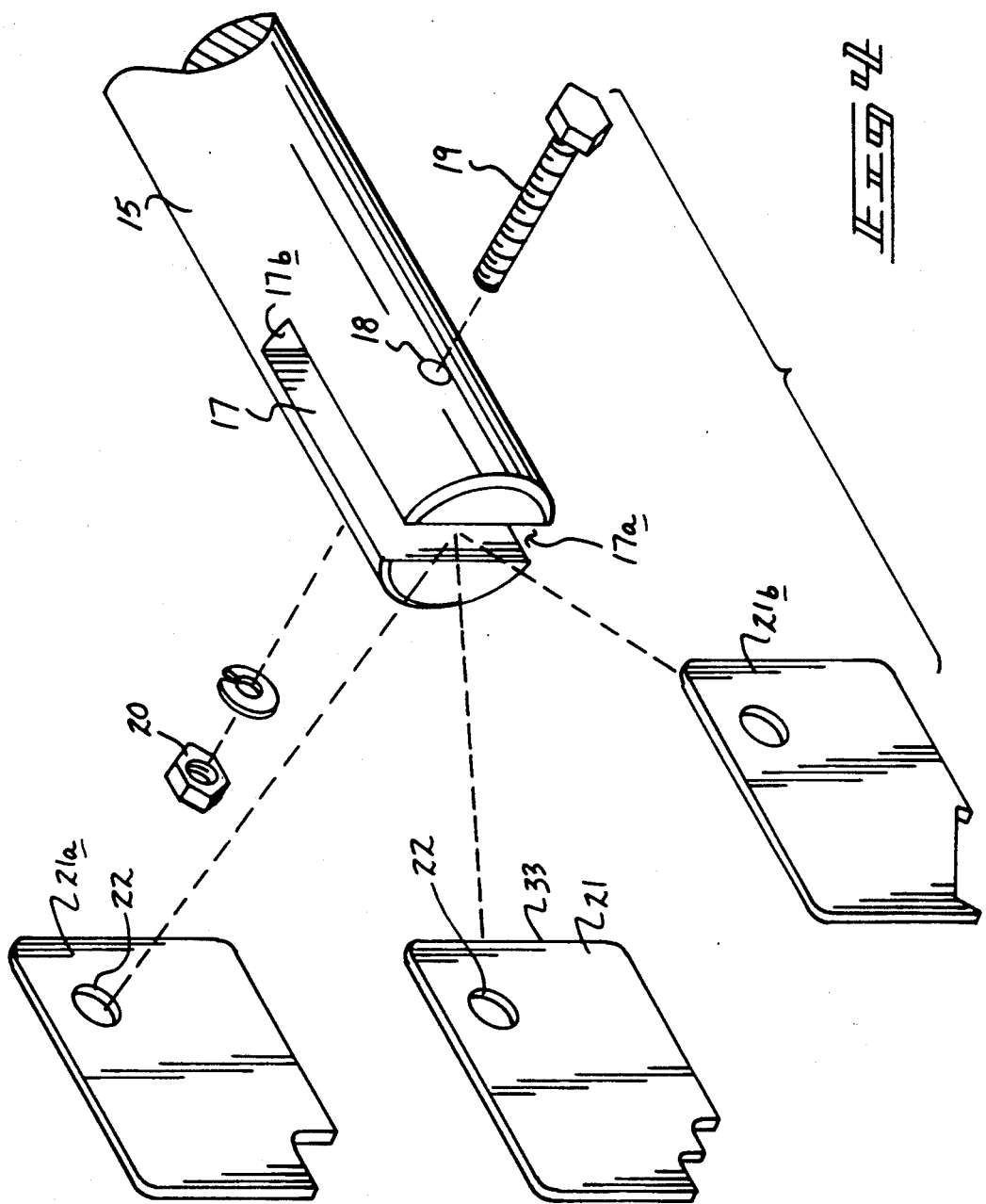

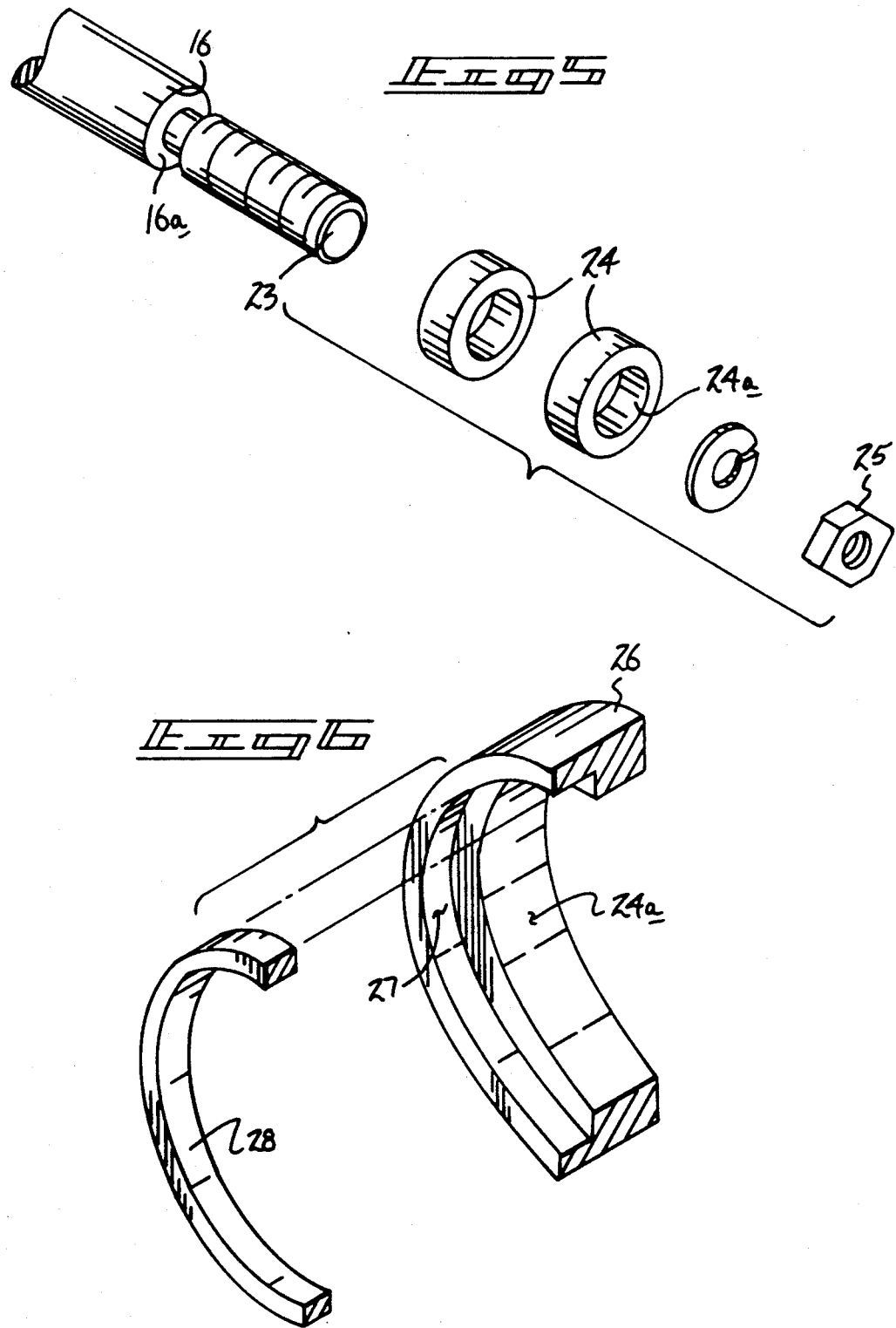

WOODWORKING ROTARY CUTTER APPARATUS

BACKGROUND OF THE INVENTION

1. Field of the Invention

The field of invention relates to woodworking tools, and more particularly pertains to a new and improved woodworking rotary cutter apparatus wherein the same is arranged for mounting to a collet in the shaping of an underlying workpiece during rotation of the apparatus.

2. Description of the Prior Art

Various woodworking tools of various types are utilized in the prior art for shaping, cutting, and the like. Such tools are exemplified for example in U.S. Pat. No. 4,293,254 to Markovics wherein a counter-sink tool utilizes blades mounted to a conical surface of the tool.

U.S. Pat. No. 4,334,446 to Field sets forth a cutting tool and holder wherein a slotted tool replaceably mounts wedge-shaped cutter pieces therewithin.

U.S. Pat. No. 4,325,661 to Tickins sets forth a drill bit end protector wherein the organization is used in securing one end of a double-ended drill bit within a drill chuck.

Accordingly, it may be appreciated that there continues to be a need for a new and improved woodworking rotary cutter apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of woodworking tools now present in the prior art, the present invention provides a woodworking rotary cutter apparatus wherein the same is mounted to a chuck in the rotary shaping of an underlying workpiece. As such, the general purpose of the present invention, which will be described subsequently in greater detail, is to provide a new and improved woodworking rotary cutter apparatus which has all the advantages of the prior art woodworking tools and none of the disadvantages.

To attain this, the present invention provides a cutter apparatus for use in providing woodworking patterns within a workpiece including a cylindrical base member formed with a cylindrical collared shank coaxially aligned and orthogonally mounted to the top end portion of the cylindrical base member, with a cylindrical support shank diametrically directed orthogonally relative to the cylindrical base member, with the cylindrical support shank including a forward end mounting a cutter blade replaceably thereto, with a rear terminal end of the support shank mounting counter-balanced weights in adjustable relationship for counter-balancing the organization in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phaseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved woodworking rotary cutter apparatus which has all the advantages of the prior art woodworking tools and none of the disadvantages.

It is another object of the present invention to provide a new and improved woodworking rotary cutter apparatus which may be easily and efficiently manufactured and marketed.

It is a further object of the present invention to provide a new and improved woodworking rotary cutter apparatus which is of a durable and reliable construction.

An even further object of the present invention is to provide a new and improved woodworking rotary cutter apparatus which is susceptible of a low cost of manufacture with regard to both materials and labor, and which accordingly is then susceptible of low prices of sale to the consuming public, thereby making such woodworking rotary cutter apparatus economically available to the buying public.

Still yet another object of the present invention is to provide a new and improved woodworking rotary cutter apparatus which provides in the apparatuses and methods of the prior art some of the advantages thereof, while simultaneously overcoming some of the disadvantages normally associated therewith.

Still another object of the present invention is to provide a new and improved woodworking rotary cutter apparatus wherein the same is arranged for mounting to a chuck to (rotatably direct the organization into an underlying workpiece.)

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric exploded view of the forward end of the cylindrical support shank.

FIG. 5 is an exploded isometric illustration of the rear end portion of the cylindrical support shank.

FIG. 6 is an isometric illustration of a modified counter-weight utilized by the instant invention.

DESCRIPTION OF THE PREFERRED EMBODIMENT

Figure 1:
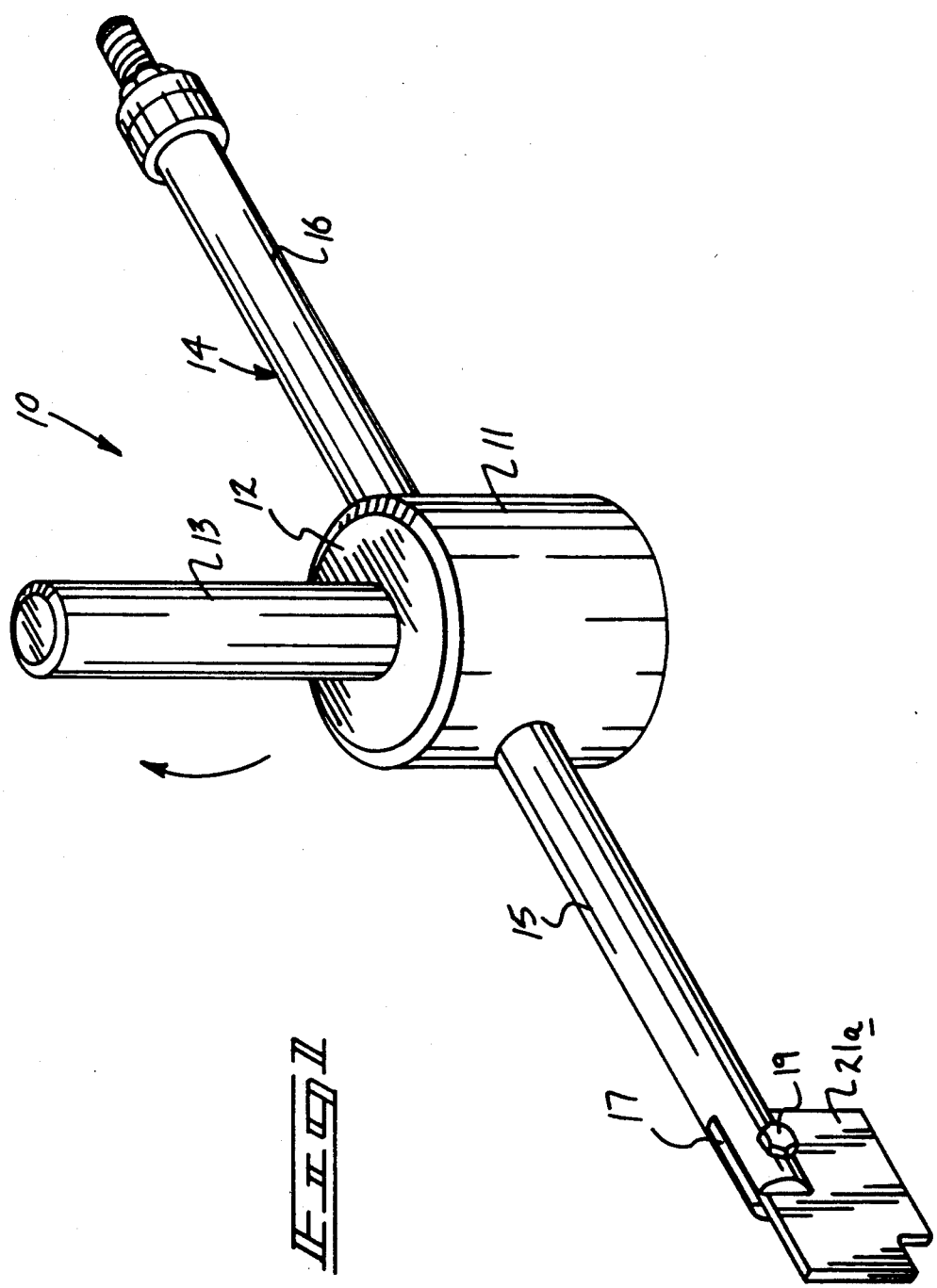
FIG. 1 is an isometric illustration of the instant invention.
Figure 2:
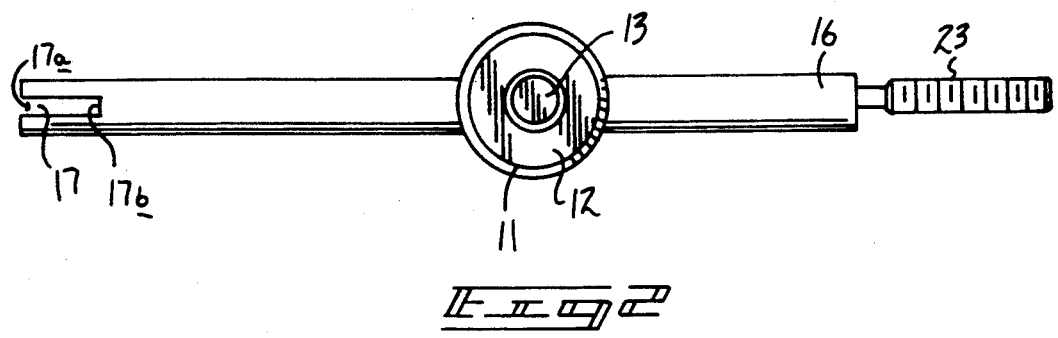
FIG. 2 is an orthographic top view of the instant invention.

With reference now to the drawings, and in particular to FIGS. 1 to 6 thereof, a new and improved woodworking rotary cutter apparatus embodying the principles and concepts of the present invention and generally designated by the reference numeral 10 will be described.

Figure 3:
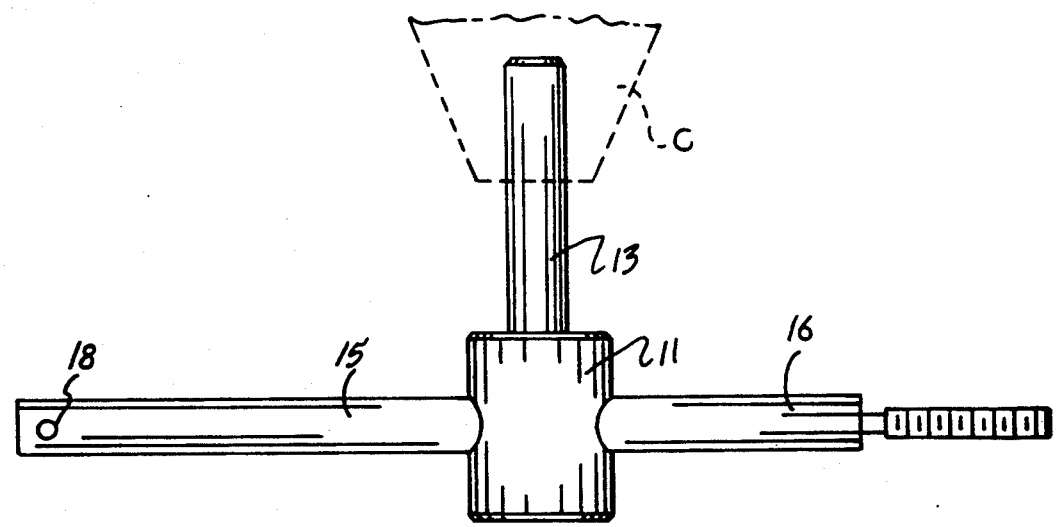
FIG. 3 is an orthographic side view, taken in elevation, of the instant invention.

More specifically, the woodworking rotary cutter apparatus 10 of the instant invention essentially comprises a cylindrical base member 11 defined along the cylindrical axis, including a top wall 12 orthogonally oriented relative to the cylindrical axis. A cylindrical collet shank 13 is fixedly, integrally, and coaxially mounted to the top wall 12 relative to the cylindrical axis for reception within a cylindrical collet "C", as illustrated in FIG. 3 for example. The apparatus includes a cylindrical support shank 14 diametrically and orthogonally directed through the cylindrical axis of the base member 11 defined by a first shank member 15 and a second shank member 16 directed through opposed sides of the base member 11 in longitudinal alignment relative to one another. The first shank member 15 includes a first shank member slot 17, wherein the slot is oriented parallel to the cylindrical axis of the base members 11 and 13 and formed with a slot entrance 17a and a slot end 17b (see FIG. 4). A plurality of coaxially aligned bores 18 are orthogonally oriented through the slot 17 through the bifurcated forward end portion of the first shank member 15, wherein the aligned bores 18 receive a fastener bolt 19 therethrough, with a fastener nut member 20 securing a cutter blade 21 received within the slot 17. The cutter blade 21 includes a cutter blade bore 22 receiving the fastener bolt 19, wherein the cutter blade further includes a blade rear end edge 33 for abutment against the slot end 17b (see FIG. 4). Accordingly, a spacing between the cutter blade bore 22 and the blade rear end edge 33 defined a distance equal to a predetermined distance, wherein this distance is equivalent to a predetermined distance from the aligned bores 18 to the slot end 17b to fixedly mount the associated cutter blade 21 in a predetermined orientation relative to the slot 17. As illustrated in FIG. 4, alternate blades 21a and 21b may be utilized, each formed with an associated bore 22 in a like relationship relative to a rear end edge, with the blades formed with various patterns of cutter for various cutting procedures in a woodworking environment.

The second shank member 16 includes a second shank threaded rear end 23 defined by a predetermined diameter to slidably receive a plurality of counter-weights 24 of cylindrical configuration, wherein the counter-weights 24 include a counter-weight bore 24a equal to the predetermined diameter. A second shank fastener 25 threadedly received upon the second shank threaded rear end 23 fixes the counter-weights in a predetermined orientation. It may be realized that various spacers may be utilized between a shoulder defined by the second shank member 16 and the threaded rear end 23 to position the counter-weights upon the rear end.

FIG. 6 illustrates the use of a modified counter-weight 26 that includes a counter-weight bore 24a equal to the predetermined diameter, and further includes a counter-bore 27 defined by a further diameter greater than the predetermined diameter but less than a fixed diameter defined by the second shank member 16, wherein the counter-bore 27 mounts a modified second counter-weight 28 therewithin of cylindrical configuration, wherein the modified second counter-weight 28 defines an internal diameter equal to the predetermined diameter, but an external diameter equal to the further diameter to fixedly position the modified second counter-weight 28 within the counter bore 27 for a locked relationship between the rear shoulder 16a of the second shank member 16 and the second counter-weight 28.

A collet "C", such as illustrated in FIG. 3, securedly receives the collet shank. At least one of the blades of the cutting blades 21, 21a, and 21b are mounted within the slot 17. The counter-weight structure 24, 26, 28 as to be utilized has been previously adjusted to compensate for various discrepancies in blade weight and further should it be so desired, may be offset to provide for imbalance and rotation to further provide and impart a pattern onto a woodworking piece to be engaged by the cutter structure. In this manner, various patterns of various types may be imparted to an underlying woodworking workpiece to present patterns limited only by the imagination of an operator in use of the instant organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A woodworking rotary cutter apparatus for securement to a collet member, wherein the apparatus comprises, a cylindrical base member, the cylindrical base member including a cylindrical axis defined by the base member, wherein the cylindrical base member includes a cylindrical base member top wall orthogonally oriented to the cylindrical axis, and a cylindrical collet shank integrally and coaxially mounted to the top wall, and a cylindrical support shank diametrically directed through the cylindrical base member orthogonally oriented relative to the cylindrical axis, wherein the cylindrical support shank includes a first shank member and a second shank member, each longitudinally aligned relative to one another and projecting from opposed sides of the cylindrical base member, wherein the first shank member includes a first shank member forward end mounting a cutter blade spaced from the cylindrical base member, and the second shank member rear end spaced from the cylindrical base member includes counter-weight means for counter-balancing the cutter blade during rotation of the cylindrical base member.

2. An apparatus as set forth in claim 1 wherein the first shank member includes a slot, the slot is oriented parallel relative to the cylindrical axis, and includes a slot entrance spaced from and parallel to a slot end, and further includes a plurality of aligned bores orthogonally directed through the forward end of the first shank member defining a bifurcated forward end, wherein the aligned bores are spaced from the slot end a predetermined distance, and the blade member includes a blade member bore, and a blade member rear end edge, and the blade member bore is spaced from the rear end edge a distance equal to the predetermined distance, and a fastener bolt is removably directed through the aligned bores and the cutter blade bore to fixedly mount and align the cutter blade within the slot.

3. An apparatus as set forth in claim 2 wherein the counter-weight means includes a threaded external end formed about the rear terminal end of the second shank member defined by a first diameter, wherein the second shank member is defined by a second diameter greater than the first diameter, and at least one cylindrical counter-weight member mounted on the threaded end, wherein the counter-weight member includes an internal bore equal to the first diameter, and a second shank fastener threadedly securable to the threaded rear end to secure the counter-weight member to the threaded rear end.

4. An apparatus as set forth in claim 3 wherein the counter-weight member includes a counter-bore defined by a further diameter greater than the first diameter defined by the counter-weight bore, and the further diameter is less than the second diameter of the second shank member, and a further cylindrical counter-weight received within the counter-bore, wherein the further counter-weight includes an internal diameter equal to the predetermined diameter and an external diameter equal to the further diameter to nestably mount the further counter-weight member within the counter-bore.

* * * * *